United States Patent
Feng et al.

(10) Patent No.: US 10,605,902 B2
(45) Date of Patent: Mar. 31, 2020

(54) MOTION COMPENSATION METHOD AND APPARATUS APPLICABLE TO LASER POINT CLOUD DATA

(71) Applicant: BEIJING BAIDU NETCOM SCIENCE AND TECHNOLOGY CO., LTD., Beijing (CN)

(72) Inventors: Kaiwen Feng, Beijing (CN); Zhuo Chen, Beijing (CN); Bocong Liu, Beijing (CN); Chengliang Deng, Beijing (CN); Yibing Liang, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 479 days.

(21) Appl. No.: 15/411,927

(22) Filed: Jan. 20, 2017

(65) Prior Publication Data

US 2018/0074176 A1 Mar. 15, 2018

(30) Foreign Application Priority Data

Sep. 14, 2016 (CN) .......................... 2016 1 0824411

(51) Int. Cl.
| | | |
|---|---|---|
| *G01S 7/497* | (2006.01) | |
| *G01S 7/48* | (2006.01) | |
| *G01S 17/42* | (2006.01) | |
| *G01S 17/89* | (2020.01) | |
| *G01S 17/93* | (2020.01) | |

(52) U.S. Cl.
CPC ............ *G01S 7/497* (2013.01); *G01S 7/4808* (2013.01); *G01S 17/42* (2013.01); *G01S 17/89* (2013.01); *G01S 17/936* (2013.01)

(58) Field of Classification Search
None
See application file for complete search history.

(56) References Cited

U.S. PATENT DOCUMENTS

| 2004/0141187 A1* | 7/2004 | Johnston .............. G01B 21/042 356/608 |
|---|---|---|
| 2017/0247029 A1* | 8/2017 | Watanabe ......... B60W 30/0956 |
| 2018/0074176 A1* | 3/2018 | Feng ...................... G01S 7/497 |

* cited by examiner

*Primary Examiner* — Omar F Fernandez Rivas
*Assistant Examiner* — Michael Edward Cocchi
(74) *Attorney, Agent, or Firm* — Marshall, Gerstein & Borun LLP (57) ABSTRACT

A motion compensation method and apparatus applicable to laser point cloud data includes acquiring laser point cloud data of a frame; using an acquisition time of a start point as a target time; interpolating coordinate transformation relations and an end laser point, to obtain coordinate transformation relations of other laser points, and transforming coordinates of the other laser points to the coordinates at the target time. During motion compensation on each frame of laser point cloud data, the coordinate transformation relations corresponding to only the start and end laser points are obtained, and the coordinate transformation relations corresponding to the two points are interpolated to obtain transformation relations corresponding to other laser points, thus performing motion compensation. Therefore, the processing speed is improved and meets high real-time requirements on systems such as autopilot control systems.

7 Claims, 3 Drawing Sheets

MOTION COMPENSATION METHOD AND APPARATUS APPLICABLE TO LASER POINT CLOUD DATA

CROSS-REFERENCE TO RELATED APPLICATION

This application is related to and claims priority from Chinese application No. 201610824411.1, filed on Sep. 14, 2016, entitled "Motion Compensation Method and Apparatus Applicable to Laser Point Cloud Data", the entire disclosure of which is hereby incorporated by reference.

TECHNICAL FIELD

The present application relates to the field of computers, in particular, to the field of data processing, and more particularly, to a motion compensation method and apparatus applicable to laser point cloud data.

BACKGROUND

LIDARs are widely applied to systems such as an autopilot control system. The LIDAR can quickly establish a three-dimensional model of a vehicle surrounding environment by laser scanning, to provide basic data for high-precision cartography, obstacle recognition, and precise vehicle positioning, thus perceiving a vehicle traveling environment. When an object such as a self-driving car on which the LIDAR is configured is in a motion state, a three-dimensional model of a vehicle traveling environment established by directly using laser point cloud data of an acquired laser point cloud is distorted, and cannot authentically reflect a vehicle traveling environment of the self-driving car at a particular target time. Therefore, the laser point cloud acquired by the LIDAR cannot be directly used; instead, coordinates of a laser point need to be transformed into coordinates at a target time via motion compensation. A presently common motion compensation method is: pre-establishing a transformation relation tree for describing coordinate transformation relations between different acquisition time points, and selecting an acquisition time point of the first laser point as a target time. During the motion compensation on the laser point cloud data, each laser point in the laser point cloud is traversed, and a coordinate transformation relation corresponding to each laser point to the target time is separately queried from the transformation relation tree according to the acquisition time point of each laser point, to respectively transform coordinates of each laser point to the target time.

However, there are massive laser points, and each laser point in the laser point cloud requires a query process during the motion compensation. As a result, the overheads sharply increase. It is difficult to meet an extremely high requirement on real-time performance of operations in a system such as the autopilot control system, thus affecting the stability and safety of the system.

SUMMARY

The present application provides a motion compensation method and apparatus applicable to laser point cloud data, to solve the technical problem mentioned in the background.

In the first aspect, the present application provides a motion compensation method applicable to laser point cloud data, comprising: acquiring laser point cloud data of a laser point cloud frame, wherein the laser point cloud data comprises laser point data of laser points in the a laser point cloud frame, and the laser point data comprises coordinates of the laser points and acquisition time points of the laser points; selecting a start laser point and an end laser point from the laser point cloud and using the acquisition time point of the start laser point as a target time; interpolating a coordinate transformation relation corresponding to the start laser point and the coordinate transformation relation corresponding to the end laser point on the basis of positions of the acquisition time points of other laser points in the laser point cloud in a period of time from the acquisition time point of the start laser point to the acquisition time point of the end laser point, to obtain the coordinate transformation relations corresponding to the other laser points; and transforming the coordinates of the other laser points to the coordinates at the target time on the basis of the coordinate transformation relations corresponding to the other laser points, so as to perform motion compensation on the laser point cloud data.

In the second aspect, the present application provides a motion compensation apparatus applicable to laser point cloud data, comprising: an acquisition unit, configured to acquire laser point cloud data of a laser point cloud frame, wherein the laser point cloud data comprises laser point data of laser points in the a laser point cloud frame, and the laser point data comprises coordinates of the laser point and acquisition time points of the laser point; a selection unit, configured to select a start laser point and an end laser point from the laser point cloud and use the acquisition time point of the start laser point as a target time; an interpolation unit, configured to interpolate a coordinate transformation relation corresponding to the start laser point and a coordinate transformation relation corresponding to the end laser point on the basis of positions of the acquisition time points of other laser points in the laser point cloud in a period of time from the acquisition time point of the start laser point to the acquisition time point of the end laser point, to obtain coordinate transformation relations corresponding to the other laser points; and a transformation unit, configured to transform the coordinates of the other laser points to the coordinates at the target time on the basis of the coordinate transformation relations corresponding to the other laser points, so as to perform motion compensation on the laser point cloud data.

By acquiring laser point cloud data of a laser point cloud frame; selecting a start laser point and an end laser point from the laser point cloud and using an acquisition time point of the start laser point as a target time; interpolating a coordinate transformation relation corresponding to the start laser point and a coordinate transformation relation corresponding to the end laser point, to obtain coordinate transformation relations corresponding to other laser points in the laser point cloud; and transforming coordinates of the other laser points to the coordinates at the target time on the basis of the coordinate transformation relations corresponding to the other laser points, the motion compensation method and apparatus applicable to laser point cloud data provided in the present application implement that during the motion compensation on each frame of laser point cloud data, the coordinate transformation relations corresponding to only two laser points, i.e., the start laser point and the end laser point, need to be obtained, and the coordinate transformation relations corresponding to the two laser points are interpolated to obtain the coordinate transformation relations corresponding to other laser points, thus performing the motion compensation on each frame of laser point cloud data. Therefore, the processing speed of the motion compensation is improved, meeting an extremely high requirement on real-time performance of operations in systems such as an autopilot control system.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
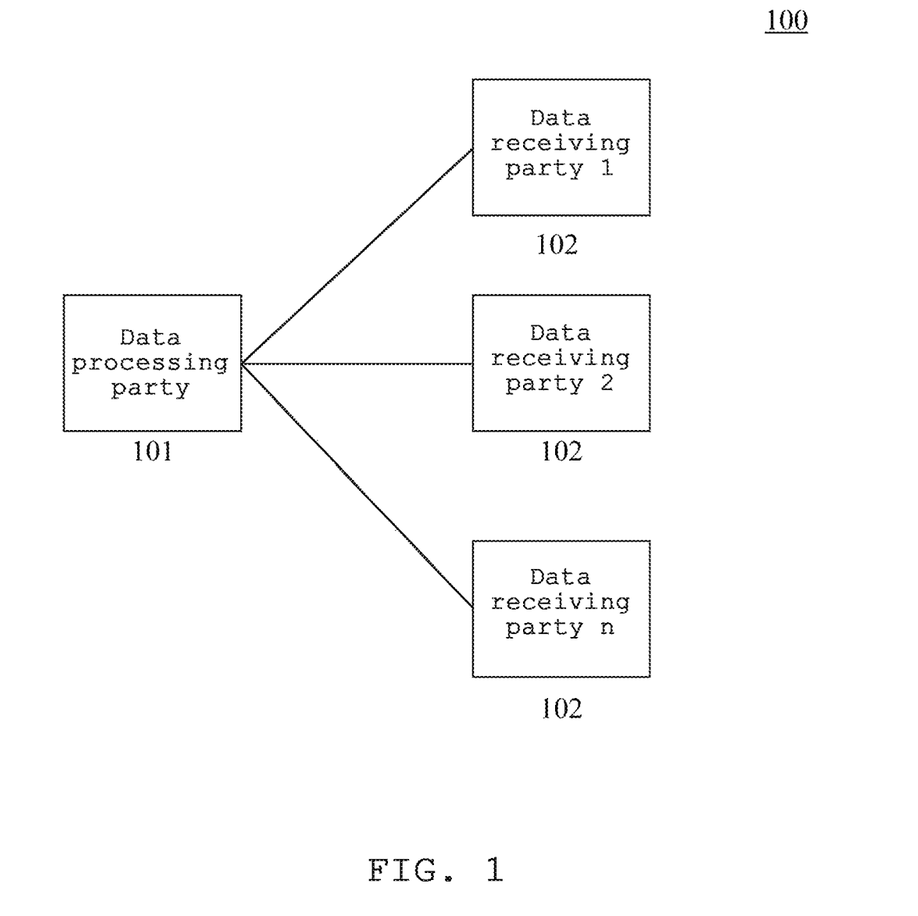
FIG. 1 shows an exemplary system architecture in which a motion compensation method or apparatus applicable to laser point cloud data according to the present application is applicable.

FIG. 1 shows an exemplary system architecture 100 in which an embodiment of a motion compensation method or apparatus applicable to laser point cloud data according to the present application can be applied.

As shown in FIG. 1, the system architecture 100 may comprise: a data processing party 101, and a plurality of data receiving parties 102. The data processing party 101 and the data receiving parties 102 may be processes running in self-driving car control system of a self-driving car. The self-driving car may be configured with a LIDAR, sensors deployed inside or outside the car, such as a speed sensor, an angle sensor and a crash sensor, and a bus for transmitting data of the sensors, for example, a Controller Area Network (CAN) bus. The data processing party 101 may perform motion compensation processing on laser point cloud data to be used by the data receiving parties 102. The data receiving parties 102 may use the motion-compensated laser point cloud data to establish a three-dimensional model of a vehicle traveling environment.

Figure 2:
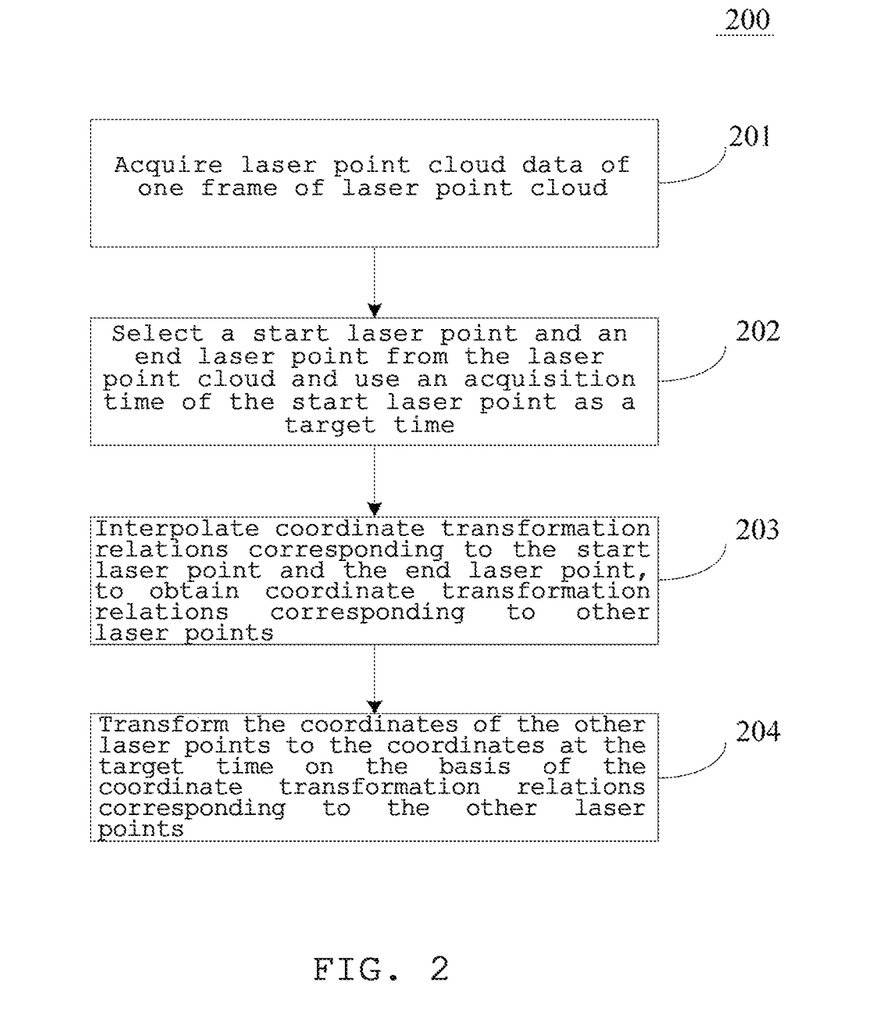
FIG. 2 shows a flow chart of an embodiment of a motion compensation method applicable to laser point cloud data according to the present application.

Please refer to FIG. 2, which shows a procedure 200 of an embodiment of a motion compensation method applicable to laser point cloud data according to the present application. It should be noted that, the motion compensation method applicable to laser point cloud data provided in this embodiment of the present application may be executed by the data processing party 101 in FIG. 1. The method comprises the following steps:

Step 201: Laser point cloud data of a laser point cloud frame is acquired.

In this embodiment, the laser point cloud data of the laser point cloud may be obtained by using a LIDAR configured on a self-driving car. The LIDAR can quickly establish a three-dimensional model of a vehicle ambient environment by laser scanning, to provide basic data for high-precision cartography, obstacle recognition, and precise vehicle positioning, thus perceiving the vehicle traveling environment. All laser points that are acquired by the LIDAR in one rotation are combined to form a laser point cloud frame. Meanwhile, the LIDAR may output laser point cloud data corresponding to a laser point cloud frame. A laser point cloud frame comprises a plurality of laser points. Correspondingly, the laser point cloud data in a laser point cloud frame comprises the laser point data of each laser point in this frame of laser point cloud. The laser point data of each laser point comprises coordinates of the laser point and an acquisition time point of the laser point. A three-dimensional model established by using a laser point cloud frame data can describe the vehicle traveling environment at a particular moment during traveling of a self-driving car.

Step 202: A start laser point and an end laser point are selected from the laser point cloud and the acquisition time point of the start laser point is used as a target time.

Before the description of selecting the start laser point and the end laser point from the laser point cloud so as to perform motion compensation on the laser point cloud data, using an autopilot system as an example, the basic principle of the motion compensation on the laser point cloud data is first described as follows: When a self-driving car is in a motion state, both the position and the state of the self-driving car is changed during one round of scanning by the LIDAR, and a three-dimensional model of the vehicle traveling environment constructed by directly using the laser point cloud data of the laser point cloud acquired by the LIDAR is distorted and cannot authentically reflect the vehicle traveling environment at a particular fixed moment (the vehicle position at the fixed moment is also fixed). Therefore, the laser point cloud data output by the LIDAR cannot be directly used; instead, it is necessary to transform the coordinates of each laser point in each frame of laser point cloud to the coordinates at a target time by using a motion compensation algorithm, and then the motion compensation is performed, thereby establishing a three-dimensional model of the vehicle traveling environment by using the motion-compensated laser point cloud data.

In this embodiment, transforming the coordinates of each laser point in a laser point cloud frame to the coordinates at a target time may refer to transforming the coordinates of each laser point in a laser point cloud frame to the coordinates in a LIDAR coordinate system corresponding to the target time.

In order to perform motion compensation on laser point cloud data in a laser point cloud frame, a start laser point and an end laser point may be first selected from the frame of laser point cloud, and an acquisition time point of the start laser point may be used as the target time.

In some optional implementations of this embodiment, selecting a start laser point and an end laser point from the laser point cloud and using an acquisition time point of the start laser point as a target time comprises: selecting a point with the earliest acquisition time as the start laser point; and selecting a point with the latest acquisition time as the end laser point.

In this embodiment, a point with the earliest acquisition time in a laser point cloud frame may be selected as the start laser point. That is, the first laser point in a laser point cloud frame is used as the start laser point. A point with the latest acquisition time in a laser point cloud frame may be selected as the end laser point. That is, the last laser point in a laser point cloud frame is used as the end laser point. The acquisition time point of the first laser point in a laser point cloud frame is used as the target time.

Step 203: Coordinate transformation relations corresponding to the start laser point and the end laser point are interpolated, to obtain the coordinate transformation relations corresponding to other laser points.

In this embodiment, the coordinate transformation relation corresponding to the start laser point and the coordinate transformation relation corresponding to the end laser point may be interpolated on the basis of positions of the acquisition time points of other laser points in the laser point cloud in a period of time from the acquisition time point of the start laser point to the acquisition time point of the end laser point, to obtain the coordinate transformation relations corresponding to the other laser points in the a laser point cloud frame.

Using an example in which the first laser point in a laser point cloud frame is used as the start laser point and the last laser point in the frame of laser point cloud is used as the end laser point, during the motion compensation, the coordinate transformation relation corresponding to each laser point in one frame of laser points may be used for transforming the laser point to the target time. The coordinate transformation relation corresponding to the first laser point may be used for transforming the coordinates of the first laser point to the target time, namely, the acquisition time point of the first laser point, and the coordinate transformation relation corresponding to the last laser point may be used for transforming the coordinates of the last laser point to the target time. According to a ratio of a period from the acquisition time point of each laser point other than the first laser point and the last laser point in a laser point cloud frame to the acquisition time point of the first laser point, to a period from the acquisition time point of the first laser point to the acquisition time point of the last laser point, the coordinate transformation relation corresponding to the first laser point and the coordinate transformation relation corresponding to the laser point may be interpolated, to obtain the coordinate transformation relation corresponding to each of the other laser points.

In some optional implementations of this embodiment, the coordinate transformation relation comprises: a translation transformation relation and a rotation transformation relation.

In some optional implementations of this embodiment, the interpolating a coordinate transformation relation corresponding to the start laser point and a coordinate transformation relation corresponding to the end laser point on the basis of at positions of acquisition time points of other laser points in the laser point cloud in a period of time from the acquisition time point of the start laser point to the acquisition time point of the end laser point, to obtain the coordinate transformation relations corresponding to the other laser points comprises: using results, which are obtained by dividing differences between the acquisition time points of the other laser points and the target time by a difference between the acquisition time point of the end laser point and the target time, as time coefficients; interpolating the translation transformation relation corresponding to the start laser point and the translation transformation relation corresponding to the end laser point on the basis of the time coefficients, to obtain translation transformation relations corresponding to the other laser points; using quaternions to represent the rotation transformation relation corresponding to the start laser point and the rotation transformation relation corresponding to the end laser point, respectively; and interpolating the quaternion corresponding to the start laser point and the quaternion corresponding to the end laser point on the basis of the time coefficients, to obtain the rotation transformation relations corresponding to the other laser points.

In this embodiment, the ratio of the period from the acquisition time point of each of the other laser points to the acquisition time point of the first laser point, to the period from the acquisition time point of the first laser point to the acquisition time point of the last laser point may be represented by using a time coefficient. The time coefficient x may be expressed as:

$$X = \frac{t - t_{min}}{t_{max} - t_{min}},$$

where t is acquisition time points of other laser points in a laser point cloud frame, $t_{min}$ is the acquisition time point of the first laser point in a laser point cloud frame, and $t_{max}$ is the acquisition time point of the last laser point in a laser point cloud frame.

In this embodiment, the translation transformation relation corresponding to the first laser point and the translation transformation relation corresponding to the last laser point may be interpolated according to the time coefficient of each of the other laser points in a laser point cloud frame, for example, smooth interpolation is performed on the translation transformation relation corresponding to the first laser point and the translation transformation relation corresponding to the last laser point, to obtain the translation transformation relation corresponding to each of the other laser points.

In this embodiment, quaternions may be used to represent the rotation transformation relation corresponding to the first laser point and the rotation transformation relation corresponding to the last laser point in a laser point cloud frame, respectively. Then, according to the time coefficient corresponding to each of the other laser points, quaternion interpolation may be performed on the quaternions respectively representing the rotation transformation relation corresponding to the first laser point and the rotation transformation relation corresponding to the last laser point, to obtain the quaternions representing the rotation transformation relations corresponding to the other laser points, thus obtaining the rotation transformation relations corresponding to the other laser points.

Step 204: Coordinates of the other laser points are transformed to the coordinates at the target time on the basis of the coordinate transformation relations corresponding to the other laser points.

In this embodiment, after the coordinate transformation relation corresponding to each laser point in a laser point cloud frame, that is, the translation transformation relation and the rotation transformation relation corresponding to each laser point in a laser point cloud frame, is determined in step 203, the coordinate transformation may be simultaneously performed on coordinates of all laser points according to the coordinate transformation relation corresponding to each laser point, to transform the coordinates of each laser point in a laser point cloud frame to the coordinate at the target time, that is, the acquisition time point of the first laser point in a laser point cloud frame. In this way, the coordinates of each laser point in a laser point cloud frame are transformed to coordinates in a LIDAR coordinate system corresponding to the acquisition time point of the first laser point, so as to perform motion compensation on the laser point cloud data in a laser point cloud frame.

In some optional implementations of this embodiment, after the transforming coordinates of the other laser points to the coordinates at the target time on the basis of the coordinate transformation relations corresponding to the other laser points, so as to perform motion compensation on the laser point cloud data, the method further comprises: constructing a model by using the motion-compensated laser point cloud data, to perceive an environment.

In this embodiment, through steps 201 to 204, motion compensation can be performed on each frame of laser point cloud data output by the LIDAR. Therefore, a model of a vehicle traveling environment is established by using each frame of motion-compensated laser point cloud data in real time.

In this embodiment, during the motion compensation on each frame of laser point cloud, the coordinate transformation relations corresponding to only two laser points, i.e., the start laser point and the end laser point, need to be obtained, and by interpolating the coordinate transformation relations corresponding to the start laser point and the end laser point, the coordinate transformation relations corresponding to the laser points with different acquisition time points in a laser point cloud frame can be obtained, to complete the motion compensation on a laser point cloud frame data. Therefore, the processing speed of motion compensation is improved, meeting an extremely high requirement on real-time performance of an environment perception operation using laser point cloud data in systems such as an autopilot control system.

Figure 3:
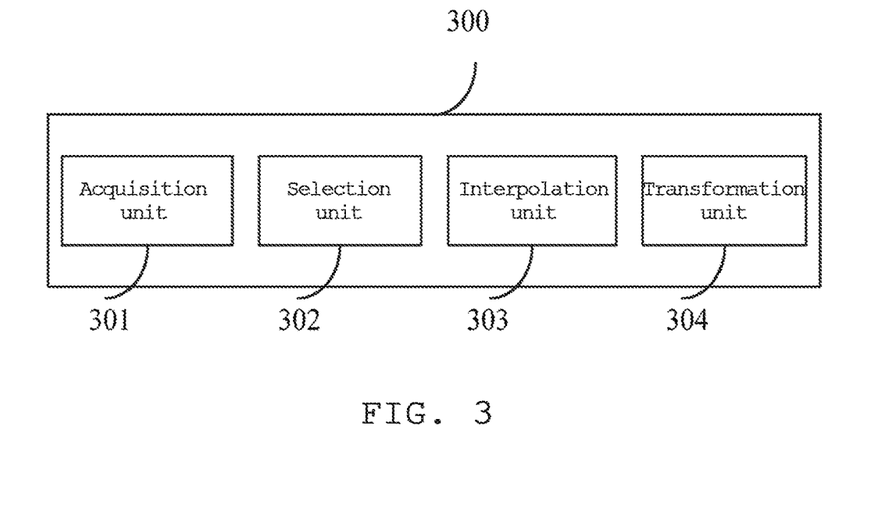
FIG. 3 shows a schematic structural diagram of an embodiment of a motion compensation apparatus applicable to laser point cloud data according to the present application.

Please refer to FIG. 3, which shows a schematic structural diagram of an embodiment of a motion compensation apparatus applicable to laser point cloud data according to the present application. This apparatus embodiment corresponds to the method embodiment shown in FIG. 2.

As shown in FIG. 3, the motion compensation apparatus 300 applicable to laser point cloud data according to this embodiment comprises: an acquisition unit 301, a selection unit 302, an interpolation unit 303, and a transformation unit 304. The acquisition unit 301 is configured to acquire laser point cloud data of a laser point cloud frame, where the laser point cloud data comprises: laser point data of each laser point in the a laser point cloud frame, and the laser point data comprises: coordinates of each laser point and an acquisition time point of each laser point; the selection unit 302 is configured to select a start laser point and an end laser point from the laser point cloud and use an acquisition time point of the start laser point as a target time; the interpolation unit 303 is configured to interpolate a coordinate transformation relation corresponding to the start laser point and a coordinate transformation relation corresponding to the end laser point on the basis of positions of the acquisition time points of other laser points in the laser point cloud in a period of time from the acquisition time point of the start laser point and the acquisition time point of the end laser point, to obtain coordinate transformation relations corresponding to the other laser points; and the transformation unit 304 is configured to transform coordinates of the other laser points to the coordinates at the target time on the basis of the coordinate transformation relations corresponding to the other laser points, so as to perform motion compensation on the laser point cloud data.

In some optional implementations of this embodiment, the selection unit 302 comprises: a laser point selection sub-unit (not shown), configured to select a point with an earliest acquisition time as the start laser point; and select a point with a latest acquisition time as the end laser point.

In some optional implementations of this embodiment, the coordinate transformation relation comprises: a translation transformation relation and a rotation transformation relation.

In some optional implementations of this embodiment, the interpolation unit 304 comprises: a coordinate transformation sub-unit (not shown), configured to use results, which are obtained by dividing differences between the acquisition time points of the other laser points and the target time by a difference between the acquisition time point of the end laser point and the target time, as time coefficients; interpolate the translation transformation relation corresponding to the start laser point and the translation transformation relation corresponding to the end laser point on the basis of the time coefficients, to obtain the translation transformation relations corresponding to the other laser points; use quaternions to represent the rotation transformation relation corresponding to the start laser point and the rotation transformation relation corresponding to the end laser point, respectively; and interpolate the quaternion corresponding to the start laser point and the quaternion corresponding to the end laser point on the basis of the time coefficients, to obtain the rotation transformation relations corresponding to the other laser points.

In some optional implementations of this embodiment, the apparatus 300 further comprises: a construction unit (not shown), configured to: after the coordinates of the other laser points are transformed to the coordinates at the target time on the basis of the coordinate transformation relations corresponding to the other laser points so as to perform motion compensation on the laser point cloud data, construct a model by using the motion-compensated laser point cloud data, to perceive an environment.

Figure 4:
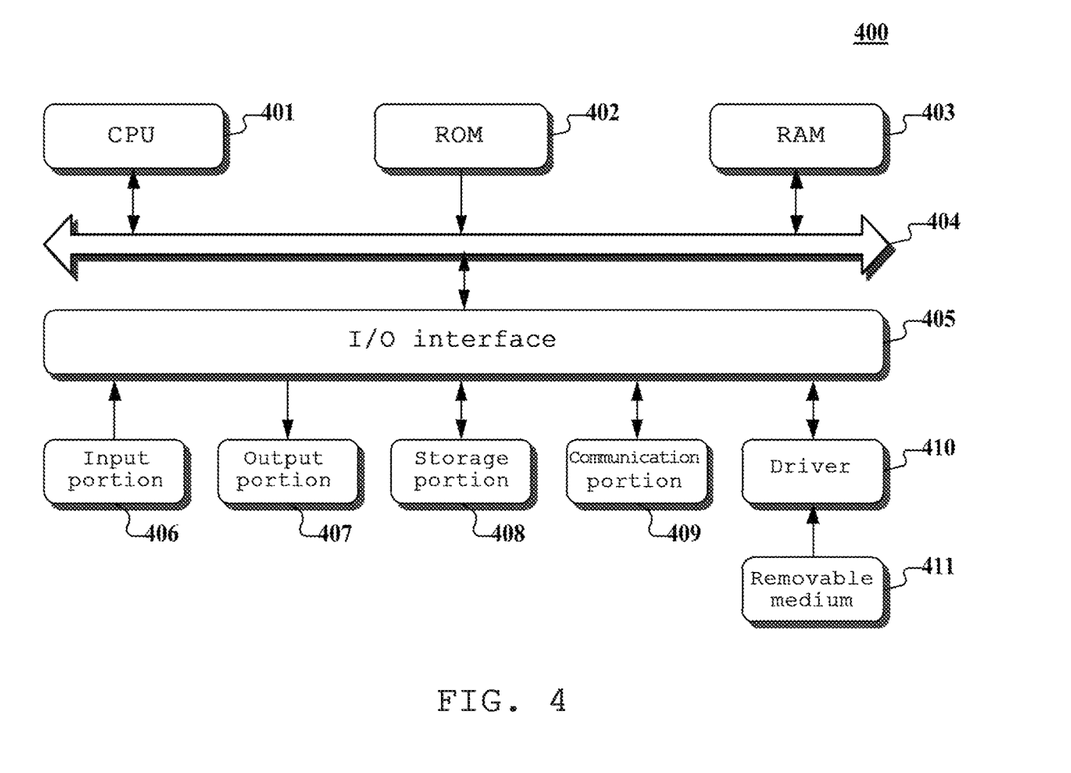
FIG. 4 shows a schematic structural diagram of a computer system suitable for implementing a motion compensation apparatus applicable to laser point cloud data according to the present application.

Referring to FIG. 4, a schematic structural diagram of a computer system suitable for implementing a motion compensation apparatus applicable to laser point cloud data according to the present application.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406 including a keyboard, a mouse etc.; an output portion 407 comprising a cathode ray tube (CRT), a liquid crystal display device (LCD), a speaker etc.; a storage portion 408 including a hard disk and the like; and a communication portion 409 comprising a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method as shown in the flowcharts. In such an embodiment, the computer program may be downloaded and installed from a network via the communication portion 409, and/or may be installed from the removable media 411.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a non-transitory computer readable storage medium. The non-transitory computer readable storage medium may be the non-transitory computer readable storage medium included in the apparatus in the above embodiments, or a stand-alone non-transitory computer readable storage medium which has not been assembled into the apparatus. The non-transitory computer readable storage medium stores one or more programs. When the one or more programs are executed by a device, the device is to: acquire laser point cloud data of a laser point cloud frame, wherein the laser point cloud data comprises laser point data of laser points in the a laser point cloud frame, and the laser point data comprises coordinates of the laser points and acquisition time points of the laser points; select a start laser point and an end laser point from the laser point cloud and using the acquisition time point of the start laser point as a target time; interpolate a coordinate transformation relation corresponding to the start laser point and the coordinate transformation relation corresponding to the end laser point on the basis of positions of the acquisition time points of other laser points in the laser point cloud in a period of time from the acquisition time point of the start laser point to the acquisition time point of the end laser point, to obtain the coordinate transformation relations corresponding to the other laser points; and transform the coordinates of the other laser points to the coordinates at the target time on the basis of the coordinate transformation relations corresponding to the other laser points, so as to perform motion compensation on the laser point cloud data.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A motion compensation method applicable to laser point cloud data, comprising:

acquiring laser point cloud data of a laser point cloud frame, the laser point cloud data comprising laser point data of laser points in the laser point cloud frame, the laser point data comprising coordinates of the laser points and acquisition time points of the laser points;

selecting a start laser point and an end laser point from the laser point cloud and using an acquisition time point of the start laser point as a target time;

interpolating a first coordinate transformation relation corresponding to the start laser point and a second coordinate transformation relation corresponding to the end laser point, on the basis of positions of acquisition time points of remaining laser points in the laser point cloud in a time period from the acquisition time point of the start laser point to an acquisition time point of the end laser point, to obtain coordinate transformation relations corresponding to the remaining laser points; and transforming the coordinates of the remaining laser points to coordinates at the target time on the basis of the coordinate transformation relations corresponding to the remaining laser points, so as to perform motion compensation on the laser point cloud data;

wherein the first coordinate transformation relation comprises a first translation transformation relation and a first rotation transformation relation, and the second coordinate transformation relation comprises a second translation transformation relation and a second rotation transformation relation; and the interpolating the first coordinate transformation relation corresponding to the start laser point and the second coordinate transformation relation corresponding to the end laser point, on the basis of positions of acquisition time points of remaining laser points in the laser point cloud in a time period from the acquisition time point of the start laser point to an acquisition time point of the end laser point, to obtain coordinate transformation relations corresponding to the remaining laser points comprises:

using results, obtained by dividing differences between the acquisition time points of the remaining laser points and the target time by a difference between the acquisition time point of the end laser point and the target time, as time coefficients;

interpolating the first translation transformation relation corresponding to the start laser point and the second translation transformation relation corresponding to the end laser point, on the basis of the time coefficients, to obtain the translation transformation relations corresponding to the remaining laser points;
using quaternions to respectively represent the first rotation transformation relation corresponding to the start laser point and the second rotation transformation relation corresponding to the end laser point; and
interpolating a quaternion corresponding to the start laser point and a quaternion corresponding to the end laser point on the basis of the time coefficients, to obtain the rotation transformation relations corresponding to the remaining laser points.

2. The method according to claim 1, wherein the selecting a start laser point and an end laser point from the laser point cloud and using the acquisition time point of the start laser point as a target time comprises:
selecting a point with an earliest acquisition time as the start laser point; and
selecting a point with a latest acquisition time as the end laser point.

3. The method according to claim 1, wherein after the transforming the coordinates of the other laser points to the coordinates at the target time on the basis of the coordinate transformation relations corresponding to the other laser points, so as to perform motion compensation on the laser point cloud data, the method further comprises:
constructing a model by using the motion-compensated laser point cloud data.

4. A motion compensation apparatus applicable to laser point cloud data, comprising:
at least one processor; and
a memory storing instructions, which when executed by the at least one processor, cause the at least one processor to perform operations, the operations comprising:
acquiring laser point cloud data of a laser point cloud frame, the laser point cloud data comprising laser point data of laser points in the laser point cloud frame, the laser point data comprising coordinates of the laser points and acquisition time points of the laser points;
selecting a start laser point and an end laser point from the laser point cloud and using an acquisition time point of the start laser point as a target time;
interpolating a first coordinate transformation relation corresponding to the start laser point and a second coordinate transformation relation corresponding to the end laser point, on the basis of positions of acquisition time points of remaining laser points in the laser point cloud in a time period from the acquisition time point of the start laser point to an acquisition time point of the end laser point, to obtain coordinate transformation relations corresponding to the remaining laser points; and
transforming the coordinates of the remaining laser points to coordinates at the target time on the basis of the coordinate transformation relations corresponding to the remaining laser points, so as to perform motion compensation on the laser point cloud data;
wherein the first coordinate transformation relation comprises a first translation transformation relation and a first rotation transformation relation, and the second coordinate transformation relation comprises a second translation transformation relation and a second rotation transformation relation; and
the interpolating the first coordinate transformation relation corresponding to the start laser point and the second coordinate transformation relation corresponding to the end laser point, on the basis of positions of acquisition time points of remaining laser points in the laser point cloud in a time period from the acquisition time point of the start laser point to an acquisition time point of the end laser point, to obtain coordinate transformation relations corresponding to the remaining laser points comprises:
using results, obtained by dividing differences between the acquisition time points of the remaining laser points and the target time by a difference between the acquisition time point of the end laser point and the target time, as time coefficients;
interpolating the first translation transformation relation corresponding to the start laser point and the second translation transformation relation corresponding to the end laser point, on the basis of the time coefficients, to obtain the translation transformation relations corresponding to the remaining laser points;
using quaternions to respectively represent the first rotation transformation relation corresponding to the start laser point and the second rotation transformation relation corresponding to the end laser point; and
interpolating a quaternion corresponding to the start laser point and a quaternion corresponding to the end laser point on the basis of the time coefficients, to obtain the rotation transformation relations corresponding to the remaining laser points.

5. The apparatus according to claim 4, wherein the selecting a start laser point and an end laser point from the laser point cloud and use an acquisition time point of the start laser point as a target time comprises:
selecting a point with an earliest acquisition time as the start laser point; and selecting a point with a latest acquisition time as the end laser point.

6. The apparatus according to claim 5, wherein the operations further comprise:
after the coordinates of the other laser points are transformed to the coordinates at the target time on the basis of the coordinate transformation relations corresponding to the other laser points so as to perform motion compensation on the laser point cloud data, constructing a model by using the motion-compensated laser point cloud data.

7. A non-transitory storage medium storing one or more programs, the one or more programs when executed by an apparatus, causing the apparatus to perform a motion compensation method applicable to laser point cloud data, comprising:
acquiring laser point cloud data of a laser point cloud frame, the laser point cloud data comprising laser point data of laser points in the laser point cloud frame, the laser point data comprising coordinates of the laser points and acquisition time points of the laser points;
selecting a start laser point and an end laser point from the laser point cloud and using an acquisition time point of the start laser point as a target time;
interpolating a first coordinate transformation relation corresponding to the start laser point and a second coordinate transformation relation corresponding to the end laser point, on the basis of positions of acquisition time points of remaining laser points in the laser point cloud in a time period from the acquisition time point of the start laser point to an acquisition time point of the end laser point, to obtain coordinate transformation relations corresponding to the remaining laser points; and
transforming the coordinates of the remaining laser points to coordinates at the target time on the basis of the coordinate transformation relations corresponding to the remaining laser points, so as to perform motion compensation on the laser point cloud data;

wherein the first coordinate transformation relation comprises a first translation transformation relation and a first rotation transformation relation, and the second coordinate transformation relation comprises a second translation transformation relation and a second rotation transformation relation; and the interpolating the first coordinate transformation relation corresponding to the start laser point and the second coordinate transformation relation corresponding to the end laser point, on the basis of positions of acquisition time points of remaining laser points in the laser point cloud in a time period from the acquisition time point of the start laser point to an acquisition time point of the end laser point, to obtain coordinate transformation relations corresponding to the remaining laser points comprises:

using results, obtained by dividing differences between the acquisition time points of the remaining laser points and the target time by a difference between the acquisition time point of the end laser point and the target time, as time coefficients;

interpolating the first translation transformation relation corresponding to the start laser point and the second translation transformation relation corresponding to the end laser point, on the basis of the time coefficients, to obtain the translation transformation relations corresponding to the remaining laser points;

using quaternions to respectively represent the first rotation transformation relation corresponding to the start laser point and the second rotation transformation relation corresponding to the end laser point; and interpolating a quaternion corresponding to the start laser point and a quaternion corresponding to the end laser point on the basis of the time coefficients, to obtain the rotation transformation relations corresponding to the remaining laser points.

\* \* \* \* \*